United States Patent [19]

Garceau et al.

[11] Patent Number: 4,676,480

[45] Date of Patent: Jun. 30, 1987

[54] BALL VALVE

[75] Inventors: Patrick Garceau, Saint Marcel; Patrick Lhuillery, Saint Aubin/Gaillon; Paul Dumont, Vernon, all of France

[73] Assignee: Societe Anonyme: Societe Europeenne de Propulsion, Puteaux, France

[21] Appl. No.: 816,276

[22] Filed: Jan. 6, 1986

[30] Foreign Application Priority Data

Jan. 11, 1985 [FR] France ................................ 85 00387

[51] Int. Cl.$^4$ ............................................. F16K 25/00
[52] U.S. Cl. ..................................... 251/159; 251/163; 251/174
[58] Field of Search ................. 251/159, 162, 163, 174

[56] References Cited

U.S. PATENT DOCUMENTS

| 2,661,926 | 12/1953 | Resek | 251/159 |
| 2,883,147 | 4/1959 | Mirza | 251/159 X |
| 3,033,237 | 5/1962 | Belford | 251/159 X |
| 3,245,653 | 4/1966 | Lavigueur | 251/159 |
| 3,485,475 | 12/1969 | Moore | 251/159 |
| 3,960,363 | 6/1976 | Domyan | 251/159 X |
| 4,332,267 | 6/1982 | Evans . | |

FOREIGN PATENT DOCUMENTS

| 2945153 | 5/1981 | Fed. Rep. of Germany ...... 251/174 |
| 2202572 | 5/1974 | France . |
| 2330932 | 6/1977 | France . |

Primary Examiner—Harold W. Weakley
Attorney, Agent, or Firm—Scully, Scott, Murphy and Presser

[57] ABSTRACT

A ball valve comprising a valve body defining inlet and outlet sections, and a ball with a calibrated through-port. The valve further comprises a stem to rotate the ball between open and closed positions, a seal to insure a fluid tight closure of the valve when the ball is in the closed position, and a mechanism for retracting the seal. This seal retracting mechanism is selectively coupled to the stem, and the mechanism eliminates all contact, when the valve is in the open position, (i) between the ball and the seal, and (ii) between the stem and the seal retracting mechanism.

10 Claims, 3 Drawing Figures

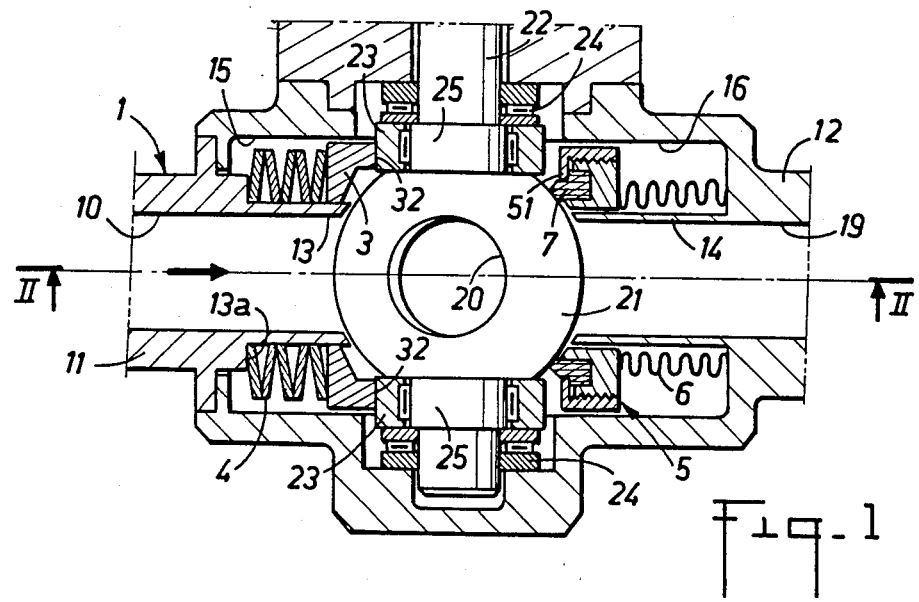
Fig-1
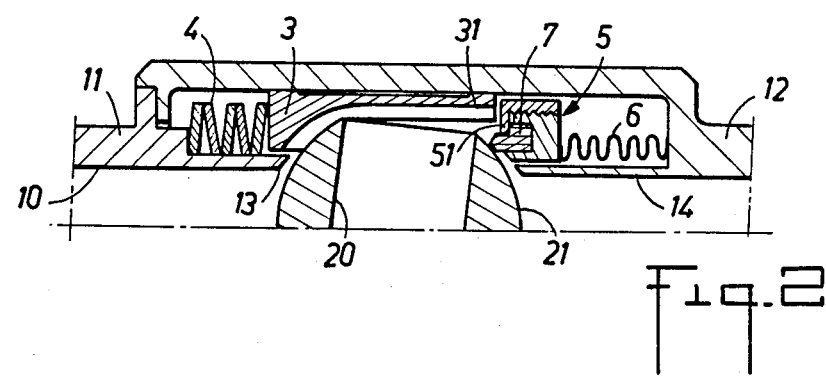
Fig.2
Fig.3
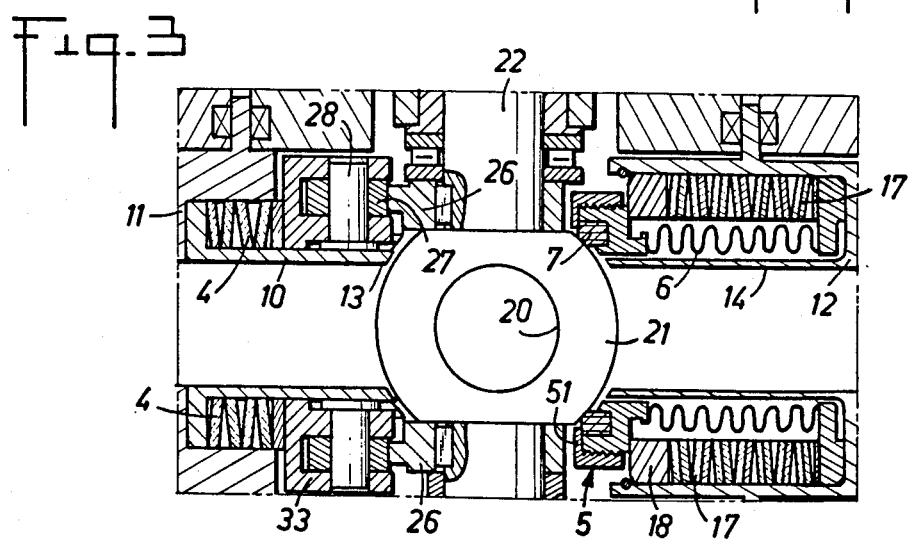

BALL VALVE

BACKGROUND OF THE INVENTION

This invention concerns a spherical ball valve comprising a valve body defining an upstream flow tube and a downstream flow tube, a spherical valve plug or ball with a calibrated opening, means for rotating the ball to turn it from a closed position to an open position and vice versa, and sealing means to ensure fluid-tight closure of the valve with the ball in closed position.

The prior art throttling-type ball valves comprise a sealing ring which is permanently engaged with the ball regardless of the position of the ball member. This seal is therefore continuously stressed and tends to have a limited life. Besides, engagement of the seal with the ball also adversely affects the accuracy of the valve.

SUMMARY OF THE INVENTION

The invention is directed to obviating the above-mentioned disadvantages by providing a ball valve having a better control capability, due to the elimination of stresses stemming from ball-to-seal contact, a longer life and improved sealing.

These several objects are achieved with a ball valve of the type mentioned at the beginning of this description which, in accordance with the invention, is further provided with means for retracting the seals. The retracting means are selectively coupled to the for rotating the ball, and comprise at least one elastic energy-storing means to cancel all contact, when the valve is open, between the ball and the sealing means on the one hand, and between the ball rotating means and the seal retracting means on the other hand.

A specific feature of the valve according to the invention is that the sealing means comprise a sealing ring fitted to a support connected to the valve body by an elastic bellows seal, which can be compressed in the longitudinal direction of the upstream and downstream flow tubes.

The sealing means are disposed in an annular cavity in the valve body, coaxial with one of the upstream and downstream flow tubes.

Additional elastic or spring means acting as dampers can be provided to cooperate with the seal support and urge the seal against the valve ball in valve closed position.

Advantageously, the seal retracting means comprise a cam and follower mechanism.

The seal retracting means are so constructed that in the open position of the valve, the cam follower is in contact with the seal support such that it removes the latter from the ball surface and the cam attached to the ball rotating means is no longer engaged with the follower.

In accordance with a first embodiment, the seal retracting means include at least one roller mounted on an eccentric journal forming a cam integral with the ball rotating means, and the roller cooperates with the cam follower to prevent the latter from coming into contact with the seal support during closure of the valve.

In an alternative embodiment, the seal retracting means comprise at least one roller mounted in the cam follower and the cam made integral with the rotational drive means engages with the follower-mounted roller to prevent the latter from making contact with the seal support during closure from the valve.

Preferably, the seal retracting means are arranged symmetrically with respect to an axial plane of the valve perpendicular to the rotational axis of the ball.

The seal retracting device according to the invention has no parts interfering with the main flow of the fluid through the valve and so does not alter the valve flow coefficient or Cv-factor of the valve.

BRIEF DESCRIPTION OF THE DRAWINGS

Other features and advantages of the invention will become apparent in reading the following description of specific embodiments thereof, made with reference to the appended drawings, in which:

FIG. 1 is an axial sectional view of a first embodiment of the ball valve according to the invention;

FIG. 2 is a half sectional view of the valve, taken axially along line II—II of FIG. 1;

and FIG. 3 is an axial sectional view of a second embodiment of the valve according to the invention.

DETAILED DESCRIPTION OF THE PREFERRED EMBODIMENTS

The ball valve of the embodiment depicted in FIG. 1 comprises a valve body 1 having a first section 11 defining an upstream flow tube 10 and a second section 12 defining a downstream flow tube 19. A ball 21, securely connected to a driving shaft or valve stem 22, is interposed between the upstream and downstream flow tubes 10 and 19 so that when the ball as in a closing or near-closing position, as shown in FIGS. 1 and 2, it interrupts communication between upstream and downstream flow lines 10, 19. By rotating the valve stem 22 the ball 21 can be turned to an open position, in which a calibrated center through hole or port 20 establishes communication between the upstream and downstream flow lines 10, 19. The control stem 22 is mounted in the valve body 1 by means of rolling bearings 24.

The second section 12 of the valve body 1 has a cylindrical wall 14 which forms a separation between the downstream flow line 19 and an annular cavity 16, which is coaxial with said flow tube 19. A seal holder or support 5 and a spring bellows 6 are disposed in cavity 16, and the bellows connects the seal support 5 to the head of the cavity 16 in the second section 12 of the valve body 1. The bellows 6 is arranged coaxially around the downstream tube 19 and can be compressed in the longitudinal direction when the seal support 5 is pushed back toward the head of the cavity 16. An annular seal 7 disposed in the seal support 5 bears against the ball 21 and forms a sealing nose providing, in combination with the bellows 6, a fluid between the valve body 1 and the ball 21 on the downstream side of the valve when the ball is in the closed position.

The use of a spring bellows 6 to connect the seal support 5 with the valve body 1 allows the seal 7 to be retracted in the useful operating range of the valve, and in so doing allows all contact between the ball 21 and the seal 7 to be eliminated. Such retraction of the support assembly 5 as a whole is accomplished with the help of a mechanism which is automatically activated when the valve is actuated.

In accordance with the embodiment depicted in FIG. 1, seal retraction is actuated in the course of rotating the ball 21 by means of a cam and follower mechanism 25 and 3 cooperating with an energy storing member 4.

The first section 11 of the valve body 1 has a cylindrical wall 13 terminating near the ball 21 and forming a separation between the upstream flow tube 10 and an annular cavity 15, which is coaxial with said upstream flow tube 10. Several series of spring washers 4 are disposed in the annular cavity 15 between a fixed end stop 13a, formed in the rear portion of the cylindrical wall 13 and the annular heel of a cam follower 3.

The follower 3 has two contact faces 32 located above and below the ball 21, on the upstream side of the ball. Faces cooperate with rollers 23 that were mounted on off-centered journals 25 that, in turn, are mounted to rotate with the valve stem 22. The follower 3 moreover has at least one elongated part 31 with a smaller cross section which extends, when the valve is in the closed position, as far as the front face 51 or thereabout of the seal support 5, near the seal 7, and which is located outboard of the seal with respect to the downstream flow tube 19.

In the near-closed position of the valve depicted in FIGS. 1 and 2, the off-centered journals 25 bring the rollers 23 into contact with the faces 32 of the follower 3. Follower 3 is held in a retracted position in which the annular heel of the following compresses the spring washers 4 placed between the heel of the follower 3 and the stop 13a on the valve body. In this position, the front end of the elongated portion 31 of the follower 3 is not in contact with the sealing nose 5, and the seal 7 bears against the ball 21 under the urging of the spring bellows 6.

When the valve is turned to the open position by rotating the ball 21 by means of the valve stem 22, the off-centered journals 25 move to a position such that the rollers 23 are no longer in contact with the cam faces 32. By the action of the energy stored by the spring washers 4, the follower 3 is moved laterally toward the ball 21, ie. toward the right in FIGS. 1 and 2. At this time, the free end of the elongated part 31 of said follower 3 comes to bear against the face 51 of the seal support 5 and thus pushes the latter away from the center of the valve and to the right in the drawing, compressing the bellows 6 and breaking the contact between the seal 7 and the ball 21. When the valve is in the open position, and within its operating range, the seal 7 is thus spaced from the ball and there is no longer any contact between the cam 25 and roller 23 and the follower 3.

It should be emphasized that the profile of the follower faces 32 and of the cams 25 is such that the point at which the seal 7 breaks away from ball 21 is preceded by sliding movement of the seal on the ball, which involves a small enough angular zone to avoid any risk of the seal's sliding into the port 20 of the ball 21.

On closing of the valve, the rollers again come to bear against the shaped surfaces 32 of the follower 3 and push back the follower 3, towards the left of FIGS. 1 and 2, thus recompressing the spring washers 4 and releasing the seal holder 5. The latter, under the action of the bellows 6, reapplies the seal 7 to the ball 21.

FIG. 3 shows an alternative embodiment wherein the seal retracting mechanism comprises cams 26 which generally perform the function of the eccentric bearing parts or journals 25 on the valve stem of FIG. 1, and cams 26 cooperate with rollers 27 that are built into a cam follower 33. Follower 33, besides including the rollers 27, is similar to the follower 3 in the previous figures, especially with regard to its elongated portion 31. The rollers 27, mounted on shafts 28, define surfaces which fulfill the function of the surfaces 32 in the embodiment of FIG. 1, and the rollers engage the cams 26 when the valve is in the closed position, as shown in FIG. 3.

The other elements of FIG. 3 are similar to those of the embodiment of FIG. 1 except that a retractable stop 17 including spring elements, is disposed behind the seal support 5 in order to both help apply the seal 7 against the ball 21 when the ball is in its closed position and to dampen any oscillating motions as may occur in the seal holder assembly 5 when the ball is in open position.

The retracting seal valve according to the invention is particularly well-suited for flow-control purposes inasmuch as, when in open position, no unwanted loads are ever applied to the ball or the stem thereof. It is thus possible to adjust the position of the ball with a reduced operating torque and a great amount of accuracy, and without wearing down the seals.

The foregoing description was given with reference to FIGS. 1 through 3 in which upstream and downstream flow tubes 10 and 19 have been defined and the seal 7 has been placed downstream from the ball 21 in all cases for ease of description. However, the invention likewise applies to such valves for which the direction of fluid flow would be reversed, ie. for which the tubes 10 and 19 would be respectively downstream and upstream lines and the seal 7 would then be disposed upstream from the ball 21.

We claim:
1. A ball valve comprising:
a valve body defining an inlet and an outlet;
a ball supported in the valve body between the inlet and the outlet, and having an open position to conduct a fluid from the inlet to the outlet, and a closed position substantially preventing the flow of the fluid from the inlet to the outlet;
valve control means connected to the ball to move the ball between the open and closed positions;
sealing means supported within the valve body for movement between a disengaged position, wherein the sealing means is spaced from the ball, and an engaged position wherein the sealing means engages the ball and develops a fluid tight seal between the ball and valve body, said sealing means being biased toward the engaged position;
retraction means supported within the valve body for movement toward and away from the sealing means, the retraction means being biased toward the sealing means; and
a cam member mounted on the ball control means for movement therewith; and
wherein as the valve control means moves the ball from its open position to its closed position, the cam member engages and moves the retraction means away from the sealing means, and the sealing means moves into its engaged position; and as the valve control means moves the ball from its closed position to its open position, the cam member becomes spaced from the retraction means, and the retraction means engages and pushes the sealing means from its engaged position to its disengaged position.

2. A ball valve according to claim 1, further comprising means supporting the sealing means for movement between the engaged and disengaged positions, and wherein:
the valve body defines a longitudinal axis;
the supporting means for the sealing means includes
(i) a compressible bellows supported in the valve body for longitudinal movement along the longitudinal axis of the valve body between compressed and expanded positions, and (ii) a seal support connected to an end of the bellows for longitudinal movement therewith; and the sealing means includes a sealing ring connected to the seal support for movement therewith toward and away from the ball.

3. A ball valve according to claim 1, wherein:

the valve body further defines an annular cavity extending around and coaxial with a selected one of the inlet and outlet; and the sealing means is disposed in said annular cavity.

4. A ball valve according to claim 2, wherein the supporting means for the sealing means further includes spring means engaging the sealing support, urging the sealing ring to the engaged position, and dampening movement of the sealing ring between the engaged and disengaged positions.

5. A ball valve according to claim 1, wherein:

the retraction means includes a follower supported for movement toward and away from the sealing means;

the cam member includes (i) an eccentric journal mounted on the valve control and (ii) a roller mounted on the eccentric journal; and as the valve control means moves the ball from the open position to the closed position, the roller engages the follower and pushes the follower away from the sealing means.

6. A ball valve according to claim 1, wherein:

the retraction means includes (i) a follower supported for movement toward and away from the sealing means, and (ii) a roller mounted on the follower for movement therewith toward and away from the sealing means; and as the valve control means moves the ball from the open position to the closed position, the cam member engages the roller and pushes the roller and the follower away from the sealing means.

7. A ball valve according to claim 1, wherein:

the valve body has a longitudinal axis;

as the ball moves between the open and closed positions, the ball moves about a ball axis, perpendicular to the longitudinal axis of the valve body; and the retraction means is symetrically arranged with respect to a longitudinal plane extending through the longitudinal axis of the valve body perpendicular to the ball axis.

8. A ball valve according to claim 1, further comprising means biasing the retraction means toward the sealing means, and wherein:

the retraction means includes a follower supported for movement toward and away from the sealing means; and the means biasing the retraction means includes a plurality of compressable spring washers supported in the valve body, engaging the follower and urging the follower toward the sealing means.

9. A ball valve according to claim 1, wherein the ball valve is a regulating valve for controlling the flow of fluid from the inlet to the outlet.

10. A ball valve according to claim 1, wherein:

the ball is supported for movement in the valve body for movement through a range of open positions to conduct fluid from the inlet to the outlet at a continuously adjustable rate; and the valve control is connected to the ball to move the ball through said range of open positions.

* * * * *